(12) United States Patent
D'Souza et al.

(10) Patent No.: US 9,126,189 B2
(45) Date of Patent: Sep. 8, 2015

(54) METHOD OF MAKING PYROCHLORES

(71) Applicant: SABIC Global Technologies B.V., Amsterdam (NL)

(72) Inventors: Lawrence D'Souza, Thuwal (SA); Vinu Viswanath, Thuwal (SA)

(73) Assignee: SABIC Global Technologies B.V., Amsterdam (NL)

( * ) Notice: Subject to any disclaimer, the term of this patent is extended or adjusted under 35 U.S.C. 154(b) by 0 days.

(21) Appl. No.: 14/311,925

(22) Filed: Jun. 23, 2014

(65) Prior Publication Data

US 2015/0014591 A1    Jan. 15, 2015

Related U.S. Application Data

(60) Provisional application No. 61/845,123, filed on Jul. 11, 2013.

(51) Int. Cl.
*B01J 23/63* (2006.01)
*B01J 23/83* (2006.01)
(Continued)

(52) U.S. Cl.
CPC *B01J 23/83* (2013.01); *B01J 21/16* (2013.01); *B01J 23/10* (2013.01); *B01J 23/42* (2013.01); *B01J 23/462* (2013.01); *B01J 23/464* (2013.01); *B01J 23/63* (2013.01); *B01J 23/755* (2013.01); *B01J 37/0201* (2013.01); *B01J 37/08* (2013.01); *C01B 3/326* (2013.01); *C01B 3/40* (2013.01); *C01G 25/00* (2013.01); *C01G 51/70* (2013.01); *C01G 53/70* (2013.01); *C01G 55/002* (2013.01);
(Continued)

(58) Field of Classification Search
CPC .............. B01J 23/63; C01B 3/00; C01B 3/08; C01B 3/38; C01B 3/40; C01B 3/326; C01B 2203/1064; C01B 2203/1241; C01B 17/0434
USPC .................................. 502/303, 349; 252/373
See application file for complete search history.

(56) References Cited

U.S. PATENT DOCUMENTS

| 3,330,697 A | 7/1967 | Maggio et al. ................... 427/79 |
| 4,192,780 A | 3/1980 | Horowitz et al. ........ 252/519.13 |

(Continued)

FOREIGN PATENT DOCUMENTS

| CA | 1 193 420 | 9/1985 |
| CA | 2 520 555 | 1/2012 |

(Continued)

OTHER PUBLICATIONS

Gaur et al. "Rh, Ni and Ca substituted pyrochlore catalysts for dry reforming of methane" Applied catalysis A: General 403 (2011) 142-151.*

(Continued)

*Primary Examiner* — Stanley Silverman
*Assistant Examiner* — Syed Iqbal
(74) *Attorney, Agent, or Firm* — Norton Rose Fulbright US LLP

(57) ABSTRACT

Disclosed is a method of making a pyrochlore comprising, obtaining a solution comprising a solvent and a metal precursor or salt thereof capable of forming a pyrochlore, wherein the metal precursor or salt thereof is dissolved in the solvent, subjecting the solution to a drying step to obtain a non-gelled or non-polymerized pyrochlore precursor material in powdered form, and subjecting the pyrochlore precursor material to a calcination step to obtain a pyrochlore.

25 Claims, 7 Drawing Sheets

(51) Int. Cl.

| | | |
|---|---|---|
| C01B 3/40 | (2006.01) | |
| B01J 21/16 | (2006.01) | |
| B01J 23/10 | (2006.01) | |
| B01J 37/08 | (2006.01) | |
| B01J 23/42 | (2006.01) | |
| B01J 23/46 | (2006.01) | |
| B01J 23/755 | (2006.01) | |
| B01J 37/02 | (2006.01) | |
| C01G 25/00 | (2006.01) | |
| C01G 51/00 | (2006.01) | |
| C01G 53/00 | (2006.01) | |
| C01G 55/00 | (2006.01) | |
| C01B 3/32 | (2006.01) | |

(52) U.S. Cl.
CPC . *C01B 2203/0238* (2013.01); *C01B 2203/0405* (2013.01); *C01B 2203/107* (2013.01); *C01B 2203/1052* (2013.01); *C01B 2203/1058* (2013.01); *C01B 2203/1064* (2013.01); *C01B 2203/1082* (2013.01); *C01B 2203/1088* (2013.01); *C01P 2002/36* (2013.01); *C01P 2002/72* (2013.01); *C01P 2004/04* (2013.01); *C01P 2006/12* (2013.01)

(56) References Cited

U.S. PATENT DOCUMENTS

| | | | |
|---|---|---|---|
| 6,482,527 | B1 | 11/2002 | Shrout et al. .......... 428/469 |
| 7,347,983 | B2 | 3/2008 | James et al. .......... 423/592.1 |
| 8,133,463 | B1 | 3/2012 | Berry .................. 423/418.2 |
| 8,241,600 | B1 | 8/2012 | Berry et al. .......... 423/418.2 |
| 8,329,129 | B2 | 12/2012 | Sato et al. ............ 423/274 |
| 8,409,543 | B2 | 4/2013 | Sato et al. ............ 423/595 |
| 2007/0269359 | A1 | 11/2007 | Fisher et al. ......... 423/263 |
| 2008/0292859 | A1 | 11/2008 | Subramanian ....... 428/220 |
| 2011/0079543 | A1 | 4/2011 | Willis et al. ......... 208/119 |

FOREIGN PATENT DOCUMENTS

| | | |
|---|---|---|
| CN | 102070335 | 5/2011 |
| CN | 102626641 | 8/2012 |
| CN | 102659400 | 9/2012 |
| CN | 102730756 | 10/2012 |
| DE | 102004020259 | 11/2005 |
| JP | 2003-246624 | 9/2003 |
| WO | WO 2010/085947 | 8/2010 |
| WO | WO 20141188278 | 11/2014 |

OTHER PUBLICATIONS

Galceran et al. "Sol-gel modified Pechini method for obtaining nanocrystalline KRE(WO4)2" J Sol-Gel Schi Techn 2007, 42, 79-88.*

Bhattacharyya et al. "CO2 reforming of methane to syngas I: evalutation of hydrotalcite clay-derived catalysts", Applied Clay Science 13 (1998) 317-328.*

S. Gaur et al. "Rh, Ni, and Ca substituted pyrochlore catalysts for dry reforming of methane." Applied Catalysts A: General 403 (2011) 142-151.

D. Pakhare et al. "Role of metal substitution in lanthanum zirconate pyrochlores (La2Zr2O7) for dry (CO2) reforming of methane (DRM)". Appl. Petrochem Res. (2012) 2:27-35.

M. S. Prasad et al. "Kaolin: processing, properties and applications." Applied Clay Science, 6, 1991, 87-119.

B. C. A. Pinheiro et al. "Obtainment of porcelain floor tiles added with petroleum oily sludge." Ceramics International. 39 (1) 2013, 57-63.

A. Feriancova et al. "The influence of kaolin filler on thermal and spectral characteristics of rubberizing components without rubber." Journal of Thermal Analysis and Calorimetry 2013, 1-6.

S. Gaur. "Dry Reforming of Methane on Rhodium and Nickel Substituted Pyrochlore Catalysts." Master's Thesis. Submitted Apr. 21, 2011.

S. Weng et al. "Autothermal steam reforming of ethanol over La2Ce2—xRuxO7 (x =0-0.35) catalyst for hydrogen production." Applied Catalysis B: Environmental 134-135 (2013) 359-366.

N. Bespalko et al. "Comparative study of NiLaZr and CoLaZr catalysts for hydrogen production by ethanol steam reforming: Effect of CO2 injection to the gas reactants. Evidence of Rh role as a promoter." Applied Catalysis A: General 407 (2011) 204-210.

J. Cheng et al. "Catalytic combustion of methane over La2TM0.3Zr1.7O7 d (TM = Mn, Fe, and Co) pyrochlore oxides." Catalysis Communications 10 (2009) 1170-1173.

D. J. Haynes et al. "Catalytic partial oxidation of n-tetradecane using pyrochlores: Effect of Rh and Sr substitution." Catalysis Today 136 (2008) 206-213.

J. M. Sohn et al. "The catalytic activity and surface characterization of Ln2B2O7 (Ln = Sm, Eu, Gd and Tb; B = Ti or Zr) with pyrochlore structure as novel CH4 combustion catalyst." Catalysis Today 83 (2003) 289-297.

S. Park et al. "Catalytic combustion of methane over rare earth stannate pyrochlore." Catalysis Letters vol. 87, Nos. 3-4, Apr. 2003.

PCT Search Report and Written Opinion issued on Feb. 2, 2015.

* cited by examiner

METHOD OF MAKING PYROCHLORES

CROSS REFERENCE TO RELATED APPLICATIONS

This application claims priority to U.S. Provisional Application No. 61/845,123 filed on Jul. 11, 2013, which is incorporated by reference in its entirety.

BACKGROUND OF THE INVENTION

A. Field of the Invention

The invention generally concerns a process for making pyrochlores, such as those that can be used as catalysts in chemical reactions.

B. Description of Related Art

Traditionally, pyrochlores have been synthesized by the so-called "Pechini" method (See, U.S. Pat. No. 3,330,697; and Sarthak Gaura et al. in "Rh, Ni, and Ca substituted pyrochlore catalysts for dry reforming of methane", Applied Catalysis A: General 403 (2011) 142-151; Devendra et al., in "Role of metal substitution in lanthanum zircon ate pyrochlores ($La_2Zr_2O_7$) for dry ($CO_2$) reforming of methane (DRM)". Appl. Petrochem. Res. (2012) 2:27-35). In general, the Pechini method is based on a blending of positive ions in a solution, controlled transformation of the solution into a polymer gel, removal of the polymer matrix and development of an oxide precursor with a high degree of homogeneity. During the Pechini process, metal salts or alkoxides are introduced into a citric acid solution with ethylene glycol. The solution is heated to over 400° C. Polycondensation of ethylene glycol and citric acid starts above 100° C., resulting in polymer citrate gel formation. When the heating temperature exceeds 400° C., oxidation and pyrolysis of the polymer matrix begin, which lead to the formation of X-ray amorphous oxide and/or carbonate precursor.

The primary problems with the Pechini method are that it is labor intensive and not cost effective. Moreover, the current methods that are available to attach the catalyst on a support material are also inefficient. Such methods oftentimes result in the production of a supported catalyst that lacks a sufficient amount of catalytic surface area while also failing to create a strong support-metal interaction to maximum activity and reduce sintering during their usage.

While proposed modifications to the Pechini method have been made, such modifications suffer from the same problems noted above. For instance, co-precipitation methods such as those disclosed in U.S. Pat. No. 8,241,600, add costs and complexity to the process.

SUMMARY OF THE INVENTION

A solution to the current inefficiencies surrounding the process of making pyrochlore catalysts has been discovered. The solution resides in the discovery of an efficient and economically viable route to produce pyrochlore catalysts and supported pyrochlore catalysts directly from a solution via a drying step and a calcination step. Notably, the process can be performed without forming a polymeric or gelled matrix from the solution, while still resulting in pyrochlore catalysts having desirable properties, such as relatively large active surface areas.

In one particular aspect, there is disclosed a method of making a pyrochlore or supported pyrochlore catalyst. The method can include obtaining a solution comprising a solvent and a metal precursor or combination of metal precursors capable of forming a pyrochlore, wherein the metal precursors are dissolved in the solvent, subjecting the solution to a drying step to obtain a non-gelled or non-polymerized pyrochlore precursor material (such as one in powdered form), and subjecting the pyrochlore precursor material to a calcination step to obtain a pyrochlore. This can be done without having to form a gelled matrix or polymeric matrix from the solution. Non-limiting examples of solvents that can be used include water, methanol, ethanol, propanol, isopropanol, butanol, acetone, or mixtures thereof. In particular instances, the solvent can be water or methanol or both. In certain aspects, the metal precursors can be a metal salt or metal oxide or a combination thereof. In some instances, the metal precursor can include a trivalent ion of La, Ce, Nd, Bi, Sc, or Y and/or a tetravalent ion of an element of Zr, Pt, Pd, Ni, Mo, Rh, Ru, or Ir, and/or a bivalent, trivalent or tetravalent ion of Ba, Ca, Cu, Mg, Ru, Rh, Pt, Pd, Ni, Co, Ir, or Mo. The produced pyrochlore can have a structure of:

$$A_xB_{y-z}C_zO_7,$$

where A can be a trivalent ion of an element of La, Ce, Nd, Bi, Sc, or Y, where $0 \leq x \leq 2$, B can be a tetravalent ion of an element of Zr, Pt, Pd, Mo, Rh, Ru, or Ir, where $0 \leq y-z \leq 2$, and C can be a bivalent, trivalent or tetravalent ion of Ba, Ca, Cu, Mg, Ru, Rh, Pt, Pd, Ni, Co, Ir, or Mo, where $0 \leq z \leq 2$. In particular instances, the produced pyrochlore can have a structure of $La_2Zr_2O_7$, $La_2Rh_{0.11}Zr_{1.89}O_7$, $La_2Ir_{0.11}Zr_{1.89}O_7$, $La_2Ni_{0.11}Zr_{1.89}O_7$, $La_2Pt_{0.11}Zr_{1.89}O_7$, or $La_2Pd_{0.11}Zr_{1.89}O_7$. The process can further include adding a chelating agent to the solution, such as citric acid, EDTA, disodium EDTA, trisodium EDTA, EGTA, phosphoric acid, or succinic acid. In particular instances, the chelating agent can be citric acid. The molar ratio of the chelating agent to the total amount by weight of metal within the metal precursors can range from 1:0.1 to 1:1.5 or 1:0.5 to 1:1.5, or 1:1 to 1:1.5, or the ratio can be about 1:1.2. The drying step can include subjecting the solution to a temperature range of 60 to 100° C. for a sufficient amount of time to substantially remove or evaporate the solvent from the solution to obtain the pyrochlore precursor material in powdered form. The drying step can be performed under atmospheric conditions, can be performed in open air such as with a hot plate or a water bath or can be performed under vacuum conditions such as with a rotary evaporator. In some instances, the slow evaporation step can be used after the drying step so as to slowly evaporate any excess or remnant solvent from the powder material, which can be used to influence the mechanical or physical properties of pyrochlore precursor material and/or the resulting pyrochlore catalyst. For instance, slow evaporation can result in a higher surface area and well defined grain size and shape of the powdered precursor material. The slow evaporation step can include subjecting the powdered pyrochlore precursor material to a temperature range of 100° C. to 150° C. for 1 to 3 hours or for a sufficient temperature and time to evaporate the excess or remnant solvent. The powdered precursor material can then be subjected to a calcination step, such as subjecting said material to a temperature range of 800° C. to 1500° C., 900° C. to 1100° C., or around 1000° C. for sufficient amount of time to produce the pyrochlore. In particular instances, the calcination step comprises subjecting the powdered material to a temperature range of 900° C. to 1100° C. for 7 to 9 hours. In particular instances, the drying step (b) and calcination step (c) are not performed in a reducing or nonoxidizing atmosphere. Also, the pyrochlore precursor material does not have to be precipitated out of the solution (e.g., such as by adding an anti-solvent—e.g., ammonium carbonate); rather the solvent in the solution can be directly evaporated from the solution to produce a powdered precursor material. Also, the process of the present invention does not rely on the use of an esterification reaction or gelling reaction or polymerization reaction to produce a gelled or polymeric matrix (e.g., such as an esterification reaction with a polyhydroxy alcohol (e.g., ethylene glycol)). The solutions of the present invention, in certain instances, do not include a polyhydroxy alcohol, such as ethylene glycol. In certain aspects, a support material can be included or mixed into the solution to form a dispersion. The dispersion can be subjected to the aforementioned drying step to evaporate the solvent, thereby resulting in a powdered precursor material that also includes the support material. Once calcined, this can create a pyrochlore catalyst that is supported by the support material. Non-limiting examples of support materials that can be used in the process of the present invention can be a metal oxide, an alkaline earth metal/metal oxide compound, a clay mineral, a pervoskite, or a zeolite based support. The metal oxide can be silica, aluminum oxide, zirconium oxide, titanium dioxide, or cerium oxide.

Also disclosed is a pyrochlore catalyst or supported pyrochlore catalyst produced by any one of the processes discussed above and throughout this specification. Non-limiting examples of the produced catalysts are disclosed throughout this specification and incorporated into this section by reference (see, e.g., Example 7, Table 1). The produced catalysts can be capable of catalyzing the production of a gaseous mixture comprising hydrogen and carbon monoxide from a hydrocarbon gas under conditions sufficient to produce a gaseous mixture comprising hydrogen and carbon monoxide. Such methods of catalytically reforming a reactant gas mixture can include providing a reactant gas mixture comprising a hydrocarbon and an oxidant, providing a catalyst produced by a process of the present invention, and contacting the reactant gas mixture with the catalyst under conditions sufficient to produce a gaseous mixture comprising carbon monoxide and hydrogen. Conditions sufficient to produce said gaseous mixture can include a temperature range of 700° C. to 1100° C. or a range from 725° C., 750° C., 775° C., or 800° C. to 900° C., 1000° C., or 1100° C. or from 800° C. to 1000° C. or from 800° C. to 1100° C., a pressure range of from 0.1 mega Pascal (Mpa) to 3.0 MPa and/or a gas hourly space velocity (GHSV) ranging from 500 to 10000 h$^{-1}$. In particular instances, the hydrocarbon comprises methane. In certain aspects, the oxidant comprises carbon dioxide, oxygen, or water, or any combination thereof. In particular instances, the hydrocarbon includes methane and the oxidant includes carbon dioxide or a mixture of carbon dioxide and oxygen, and the ratio of carbon monoxide to hydrogen in the produced gaseous mixture is approximately 1:1 or 1. In other aspects, the hydrocarbon includes methane and the oxidant comprises water (e.g., water vapor or steam), and the ratio of carbon monoxide to hydrogen in the produced gaseous mixture is approximately 1:3 or 0.33. The reactant gas mixture can include natural gas, liquefied petroleum gas comprising $C_2$-$C_5$ hydrocarbons, $C_6$+ heavy hydrocarbons (e.g., $C_6$ to $C_{24}$ hydrocarbons such as diesel fuel, jet fuel, gasoline, tars, kerosene, etc.), oxygenated hydrocarbons, and/or biodiesel, alcohols, or dimethyl ether. In particular instances, the reactant gas mixture has an overall oxygen to carbon atomic ratio equal to or greater than 0.9. The method can further include isolating and/or storing the produced gaseous mixture. The method can also include separating hydrogen from the produced gaseous mixture (such as by passing said produced gaseous mixture through a hydrogen selective membrane to produce a hydrogen permeate). The method can include separating carbon monoxide from the produced gaseous mixture (such as by passing said produced gaseous mixture through a carbon monoxide selective membrane to produce a carbon monoxide permeate). In certain aspects, the carbon formation or coking is reduced or does not occur on the supported catalyst and/or sintering is reduced or does not occur on the supported catalyst. In particular instances, carbon formation or coking and/or sintering is reduced or does not occur when said supported catalyst is subjected to temperatures at a range of greater than 700° C. to 1100° C. or a range from 725° C., 750° C., 775° C., or 800° C. to 900° C., 1000° C., or 1100° C. In particular instances, the range can be from 800° C. to 1000° C. or from 800° C. to 1100° C.

In still another aspect of the present invention, there is disclosed embodiments 1-32 as follows. Embodiment 1 is to a method of making a pyrochlore comprising: (a) obtaining a solution comprising a solvent and metal precursors capable of forming a pyrochlore, wherein the metal precursors are dissolved in the solvent; (b) subjecting the solution to a drying step to obtain a non-gelled or non-polymerized pyrochlore precursor material in powdered form; and (c) subjecting the pyrochlore precursor material to a calcination step to obtain a pyrochlore. Embodiment 2 is the method of embodiment 1, wherein the solvent is water, methanol, ethanol, propanol, isopropanol, butanol, acetone, or mixtures thereof. Embodiment 3 is the method of embodiment 2, wherein the solvent is water or methanol. Embodiment 4 is the method of any one of embodiments 1 to 3, wherein the metal precursors are metal salts or metal oxides or a combination thereof. Embodiment 5 is the method of any one of embodiments 1 to 4, wherein the metal precursors include a trivalent ion of La, Ce, Nd, Bi, Sc, or Y and/or a tetravalent ion of an element of Zr, Pt, Pd, Ni, Mo, Rh, Ru, or Ir, and/or a bivalent, trivalent or tetravalent ion of Ba, Ca, Cu, Mg, Ru, Rh, Pt, Pd, Ni, Co, Ir, or Mo. Embodiment 6 is the method of embodiment 5, wherein the pyrochlore has a structure of: $A_xB_{y-z}C_zO_7$, wherein A is a trivalent ion of an element of La, Ce, Nd, Bi, Sc, or Y, where $0 \leq x \leq 2$, B is a tetravalent ion of an element of Zr, Pt, Pd, Mo, Rh, Ru, or Ir, where $0 \leq y-z \leq 2$, and C is a bivalent, trivalent or tetravalent ion of Ba, Ca, Cu, Mg, Ru, Rh, Pt, Pd, Ni, Co, Ir, or Mo, where $0 \leq z \leq 2$. Embodiment 7 is the method of any one of embodiments 1 to 6, wherein the pyrochlore has a structure of $La_2Zr_2O_7$, $La_2Rh_{0.11}Zr_{1.89}O_7$, $La_2Ir_{0.11}Zr_{1.89}O_7$, $La_2Ni_{0.11}Zr_{1.89}O_7$, $La_2Pt_{0.11}Zr_{1.89}O_7$, or $La_2Pd_{0.11}Zr_{1.89}O_7$. Embodiment 8 is the method of any one of embodiments 1 to 7, further comprising adding a chelating agent to the solution. Embodiment 9 is the method of embodiment 8, wherein the chelating agent is citric acid, EDTA, disodium EDTA, trisodium EDTA, EGTA, phosphoric acid, or succinic acid. Embodiment 10 is the method of embodiment 9, wherein the chelating agent is citric acid. Embodiment 11 is the method of any one of embodiments 9 to 10, wherein the molar ratio of the chelating agent to the total amount by weight of metal within the metal precursors ranges from 1:0.1 to 1:1.5 or is about 1:1.2. Embodiment 12 is the method of any one of embodiments 1 to 11, wherein the drying step (b) comprises subjecting the solution to a temperature range of 60 to 100° C. for a sufficient amount of time to substantially remove or evaporate the solvent from the solution to obtain the pyrochlore precursor material in powdered form. Embodiment 13 is the method of any one of embodiments 1 to 12, wherein the drying step (b) is performed under atmospheric conditions. Embodiment 14 is the method of embodiment 13, wherein the drying step (b) comprises using a water bath or a hot plate. Embodiment 15 is the method of any one of embodiments 1 to 12, wherein the drying step (b) comprises using vacuum evaporation. Embodiment 16 is the method of embodiment 15, wherein the vacuum evaporation is performed within a rotary evaporator. Embodiment 17 is the method of embodiment 12, further comprising subjecting the pyrochlore precursor material to a temperature range of 100° C. to 150° C. for 1 to 3 hours. Embodiment 18 is the method of any one of embodiments 1 to 17, wherein the calcination step (c) comprises subjecting the pyrochlore precursor material to a temperature range of 800° C. to 1500° C., 900° C. to 1100° C., or around 1000° C. for sufficient amount of time to produce the pyrochlore. Embodiment 19 is the method of embodiment 18, wherein the calcination step (c) comprises subjecting the pyrochlore precursor material to a temperature range of 900° C. to 1100° C. for 7 to 9 hours. Embodiment 20 is the method of any one of embodiments 1 to 19, wherein the drying step (b) and calcination step (c) are not performed in a reducing or nonoxidizing atmosphere. Embodiment 21 is the method of any one of embodiments 1 to 20, wherein the pyrochlore precursor material is not precipitated out of the solution in step (a) and/or step (b) and/or wherein ammonium carbonate is not added to the solution in step (a) and/or step (b). Embodiment 22 is the method of any one of embodiments 1 to 22, wherein an esterification reaction with a polyhydroxy alcohol is not performed or wherein a polymerization step to produce a polymerized matrix in either of steps (a) or (b) is not performed. Embodiment 23 is the method of embodiment 22, wherein the polyhydroxy alcohol is ethylene glycol. Embodiment 24 is the method of any one of embodiments 1 to 23, wherein the solution in steps (a) and/or (b) does not include a polyhydroxy alcohol, such as ethylene glycol. Embodiment 25 is the method of any one of embodiments 1 to 24, wherein a support material is dispersed in the solution. Embodiment 26 is the method of embodiment 25, wherein the support material comprises a clay mineral or an alkaline earth metal/metal oxide compound. Embodiment 27 is the method of any one of embodiments 1 to 26, wherein the pyrochlore is capable of catalyzing the production of a gaseous mixture comprising hydrogen and carbon monoxide from a hydrocarbon gas. Embodiment 28 is a pyrochlore produced by the method of any one of embodiments 1 to 27. Embodiment 29 is a catalyst capable of catalyzing the production of a gaseous mixture comprising hydrogen and carbon monoxide from a hydrocarbon gas, wherein the catalyst comprises the pyrochlore of embodiment 28. Embodiment 30 is a pyrochlore precursor material produced by steps (a) and (b) of any one of embodiments 1 to 27. Embodiment 31 is a method of producing a gaseous mixture comprising contacting a reactant gas mixture comprising a hydrocarbon and an oxidant with the catalyst of embodiment 29 under conditions sufficient to produce a gaseous mixture comprising hydrogen and carbon monoxide. Embodiment 32 is a method of catalytically reforming a reactant gas mixture comprising: (a) providing a reactant gas mixture comprising a hydrocarbon and an oxidant; (b) providing the catalyst of embodiment 29; and (c) contacting the reactant gas mixture with the hydrocarbon gas reforming supported catalyst under conditions sufficient to produce a gaseous mixture comprising carbon monoxide and hydrogen.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The processes of the present invention can "comprise," "consist essentially of," or "consist of" particular steps disclosed throughout the specification. With respect to the transitional phase "consisting essentially of," in one non-limiting aspect, a basic and novel characteristic of the processes of the present invention are their scalability to produce large amounts of pyrochlore catalysts in an efficient and cost-effective manner.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further aspects, features from specific aspects may be combined with features from other aspects. For example, features from one aspect may be combined with features from any of the other aspects.

DETAILED DESCRIPTION OF THE INVENTION

Figure 1:
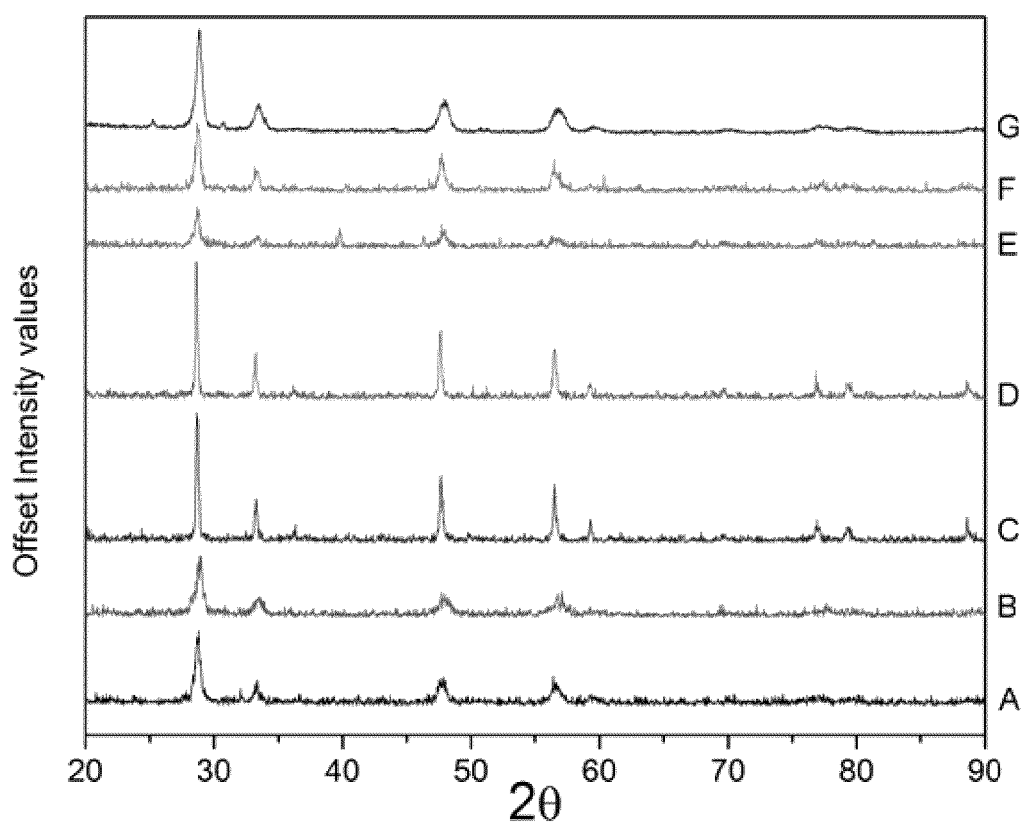
FIG. 1: Powder X-ray diffraction patterns of pyrochlore catalysis (A) $La_2Ru_{0.11}Zr_{1.89}O_7$, (B) $La_2Ir_{0.11}Zr_{1.89}O_7$, (C) $La_2Ni_{0.11}Zr_{1.89}O_7$, (D) $La_2CO_{0.11}Zr_{1.89}O_7$, (E) $La_2Pt_{0.11}Zr_{1.89}O_7$, (F) $La_2Pd_{0.11}Zr_{1.89}O_7$ and (G) $La_2Zr_2O_7$.

The currently available methods for producing pyrochlore catalysts and supported pyrochlore catalysts are inefficient, complicated, and expensive. By way of example, the Pechini method relies on the production of a gelled or polymeric phase, which requires additional materials to make such a phase, and also requires more energy in the form of heat to ultimately breakdown and remove said phase. Further, modified forms of the Pechini method and co-precipitation methods also require additional materials and processing steps to produce a useable catalyst.

The current invention provides for an elegant process for making a pyrochlore catalyst or a supported pyrochlore catalyst by simply removing a solvent from a metal precursor containing solution through a drying step. The drying step can then be followed by a calcination step or by a slow evaporation step to remove excess or remnant solvent and then a calcination step. This results in a cost-efficient, simplified, and scalable process for making the catalysts of the present invention.

These and other non-limiting aspects of the present invention are discussed in further detail in the following sections.

A. Preparing a Solution

A solution for use in a process of the present invention can be prepared by mixing a sufficient amount of metal precursors in a solvent to produce a solution. The amount of precursor material that can be added can be calculated by referencing the stoichiometric amount of a final resultant oxide material, such as shown in non-limiting aspects in the Examples. The metal precursors are of a type and in an amount that can result in the formation of a pyrochlore having a structure of:

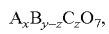

wherein A can be a trivalent ion of an element of La, Ce, Nd, Bi, Sc, or Y, where $0 \leq x \leq 2$, B can be a tetravalent ion of an element of Zr, Pt, Pd, Mo, Rh, Ru, or Ir, where $0 \leq y-z \leq 2$, and C can be a bivalent, trivalent or tetravalent ion of Ba, Ca, Cu, Mg, Ru, Rh, Pt, Pd, Ni, Co, Ir, or Mo, where $0 \leq z \leq 2$. As noted elsewhere, and as indicated by the above pyrochlore formula, non-limiting examples of metal precursors include trivalent ion of La, Ce, Nd, Bi, Sc, or Y and/or a tetravalent ion of an element of Zr, Pt, Pd, Ni, Mo, Rh, Ru, or Ir, and/or a bivalent, trivalent or tetravalent ion of Ba, Ca, Cu, Mg, Ru, Rh, Pt, Pd, Ni, Co, Ir, or Mo. Salts of said ions can also be used.

The solvent that can be used is of a kind that can sufficiently solubilize the metal precursors to create the solution. Non-limiting examples of such solvents include water, methanol, ethanol, propanol, isopropanol, butanol, acetone, or mixtures thereof.

A chelating agent can also be added to the solution to reduce the likelihood of having the metal precursors chelating with one another. Non-limiting examples of chelating agents that can be used in the context of the present invention include citric acid, EDTA, disodium EDTA, trisodium EDTA, EGTA, phosphoric acid, or succinic acid, or combinations thereof. In particular instances, a molar ratio of the chelating agent to the total amount by weight of metal within the metal precursors can range from 1:0.1 to 1:1.5 or is about 1:1.2.

Further, and in instances where a supported pyrochlore material is to be produced, a support material can be added to the solution to create a dispersion. The dispersed phase in the dispersion can be the support material, and the continuous phase in the dispersion can be the solution. The support material can be added in a solid form such as a powdered form. A variety of support materials can be dispersed in the solution. For instance, the support material can be a metal oxide, an alkaline earth metal/metal oxide compound, a clay mineral, a pervoskite, or a zeolite based support. With respect to metal oxide supports, non-limiting examples that can be used include silica, aluminum oxide, zirconium oxide, titanium dioxide, or cerium oxide, or combinations thereof.

For clay mineral supports, non-limiting examples of such materials are provided below. In particular instances, however, clay minerals having a 1:1 silicate layer structural format can be used (e.g., kaolinite). Typically, a clay mineral includes silica, alumina or magnesia or both, and water. Some clay minerals may be expressed using ideal chemical formulas as the following: $2SiO_2 \cdot Al_2O_3 \cdot 2H_2O$ (kaolinite), $4SiO_2 \cdot Al_2O_3 \cdot H_2O$ (pyrophyllite), $4SiO_2 \cdot 3MgO \cdot H_2O$ (talc), and $3SiO_2 \cdot Al_2O_3 \cdot 5FeO \cdot 4H_2O$ (chamosite). The $SiO_2$ ratio is a key factor for determining clay mineral types. Clay minerals can be classified on the basis of variations of chemical composition and atomic structure into nine groups: (1) kaolin-serpentine (kaolinite, halloysite, lizardite, chrysotile), (2) pyrophyllite-talc, (3) mica (illite, glauconite, celadonite), (4) vermiculite, (5) smectite (montmorillonite, nontronite, saponite), (6) chlorite (sudoite, clinochlore, chamosite), (7) sepiolite-palygorskite, (8) interstratified clay minerals (e.g., rectorite, corrensite, tosudite), and (9) allophane-imogolite.

The prevalent structural feature of clay minerals is the presence of hydrous-layer silicates. These features are continuous two-dimensional tetrahedral sheets of $Si_2O_5$, with $SiO_4$ tetrahedrons linked by the sharing of three corners of each tetrahedron to form a hexagonal mesh pattern. The apical oxygen at the fourth corner of the tetrahedrons, which is usually directed normal to the sheet, forms part of an adjacent octahedral sheet in which octahedrons are linked by sharing edges. There are two major types for the structural "backbones" of clay minerals called silicate layers. The unit silicate layer formed by aligning one octahedral sheet to one tetrahedral sheet is referred to as a 1:1 silicate layer, and the exposed surface of the octahedral sheet consists of hydroxyls. In another type, the unit silicate layer consists of one octahedral sheet sandwiched by two tetrahedral sheets that are oriented in opposite directions and is termed a 2:1 silicate layer. Therefore, a clay mineral comprising a 1:1 silicate layer is one in which an octahedral sheet is aligned with a tetrahedral sheet. By comparison, a clay mineral comprising a 2:1 silicate layer is one in which an octahedral sheet is aligned with a tetrahedral sheet on one side and a second tetrahedral sheet on the opposing side.

Kaolin-serpentine groups of clay minerals are 1:1 layer silicates. Their basic unit of structure includes tetrahedral and octahedral sheets in which the anions at the exposed surface of the octahedral sheet are hydroxyls. Therefore, their general structure can be expressed as: $Y_{2-3}Z_2O_5(OH)_4$, where Y are cations in the octahedral sheet such as $Al^{3+}$ and $Fe^{3+}$ for dioctahedral species and $Mg^{2+}$, $Fe^{2+}$, $Mn^{2+}$, and $Ni^{2+}$ for trioctahedral species, and Z are cations in the tetrahedral sheet, largely Si and, to a lesser extent, Al and $Fe^{3+}$. Kaolinite has a structural formula of $Al_2Si_2O_5(OH)_4$. Kaolinite is electrostatically neutral and has triclinic symmetry. Dickite and nacrite are polytypic varieties of kaolinite, both of which include a double 1:1 layer and have monoclinic symmetry, but have different stacking sequences of the two 1:1 silicate layers. Halloysite also has a composition close to that of kaolinite and is characterized by its tubular nature in contrast to the platy nature of kaolinite particles. Halloysite has a hydrated form with a composition of $Al_2Si_2O_5(OH)_4 \cdot 2H_2O$. This hydrated form irreversibly changes to a dehydrated variety at relatively low temperatures (60° C.) or upon being exposed to conditions of low relative humidity. Trioctahedral magnesium species, chrysotile, antigorite, and lizardite, have a formula of $Mg_3Si_2O_5(OH)_4$. Chrysotile crystals have a cylindrical roll morphology. Antigorite crystals exhibit an alternating wave structure. Lizardite crystals are platy and can include a small amount of substitution of aluminum or ferric iron for both silicon and magnesium.

With respect to the pyrophyllite-talc group of clay minerals, they have a 2:1 layer form with a unit thickness of approximately 9.2 to 9.6 Å. The structure is an octahedral sheet sandwiched by two tetrahedral sheets. Pyrophyllite and talc represent the dioctahedral and trioctahedral members, respectively, of the group. The structural formulas are $Al_2Si_4O_{10}(OH)_2$ for pyrophyllite and $Mg_3Si_4O_{10}(OH)_2$ for talc. Therefore, the 2:1 layers of these minerals are electrostatically neutral and are held together with van der Waals bonding.

Mica clay minerals also have a basic structural unit of the 2:1 layer type like pyrophyllite and talc. Examples include muscovite $(KAl_2(Si_3Al)O_{10}(OH)_2)$, phlogopite $(KMg_3(Si_3Al)O_{10}(OH)_2)$, biotite $(K(Mg, Fe)_3(Si_3Al)O_{10}(OH)_2)$, celadonite $(K(Mg, Fe)_3(Si_{4-x}Al_x)O_{10}(OH)_2$, where x=0-0.2), and Glauconite.

The vermiculite clay mineral includes sheets of trioctahedral mica or talc separated by layers of water molecules.

Smectite clay minerals are derived from the structures of pyrophyllite and talc. Unlike pyrophyllite and talc, the 2:1 silicate layers of smectite have a slight negative charge due to ionic substitutions in the octahedral and tetrahedral sheets. The structural formula of smectites include $(Al_{2-y}Mg^{2+}/_y)(Si_{4-x}Al_x)O_{10}(OH)_2M^+/_{x+y} \cdot nH_2O$, where $M^+$ is the interlayer exchangeable cation expressed as a monovalent cation and where x and y are the amounts of tetrahedral and octahedral substitutions, respectively ($0.2 \leq x+y \leq 0.6$). The smectites with y>x are called montmorillonite and those with x>y are known as beidellite. Nontronites are those in which ferric iron is a dominant cation in the octahedral sheet instead of aluminum and magnesium. Beidellites are those where chromium ($Cr^{3+}$) and vanadium ($V^{3+}$) also are found as dominant cations in the octahedral sheets. Trioctahedral ferromagnesian smectites have the following formula $(Mg, Fe^{2+})_3(Si_{4-x}Al_x)O_{10}(OH)_2M^+/xnH_2O$.

Chlorite clay minerals include: clinochlore $(Mg_5Al)(Si_3Al)O_{10}(OH)_8$; chamosite $(Fe_5^{2+}Al)(Si_3Al)O_{10}(OH)_8$; pennantite $(Mn_5Al)(Si_3Al)O_{10}(OH)_8$; and (nimite) $(Ni_5Al)(Si_3Al)O_{10}(OH)_8$.

Sepiolite and palygorskite are papyrus-like or fibrous hydrated magnesium silicate minerals. They include two-dimensional tetrahedral sheet of composition $Si_2O_5$ and are regarded as having narrow strips or ribbons of 2:1 layers that are linked stepwise at the corners. The structure of sepiolite is $Mg_8Si_{12}O_{30}(OH)_4(OH_2)_4(H_2O)_8$, and the structure of palygorskite is and $(Mg, Al)_5Si_8O_{20}(OH)_2(OH_2)_4(H_2O)_4$.

Interstratified clay minerals include mixtures of various clay minerals. Examples include rectorite (dioctahedral mica/montmorillonite), tosudite (dioctahedral chlorite/smectite), corrensite (trioctahedral vermiculite/chlorite), hydrobiotite (trioctahedral mica/vermiculite), aliettite (talc/saponite), and kulkeite (talc/chlorite). Other examples include illite/smectite, glauconite/smectite, dioctahedral mica/chlorite, dioctahedral mica/vermiculite, and kaolinite/smectite.

Imogolite clay mineral is an aluminosilicate with an approximate composition of $SiO_2 \cdot Al_2O_3 \cdot 2.5H_2O$. Allophane is a hydrous aluminosilicate mineral dominated by Si—O—Al bonds—i.e., the majority of aluminum atoms are tetrahedrally coordinated. Unlike imogolite, the morphology of allophane varies from fine, rounded particles through ring-shaped particles to irregular aggregates.

Any of the above noted clay minerals can be used in the context of the present invention. Further, while it is contemplated that natural/non-purified or non-isolated or non-synthetic forms can be used, in certain aspects, the clay minerals can be isolated or purified or synthetically produced. One of the reasons for using isolated or purified or synthetically produced clay minerals is to reduce or remove impurities that may cause or lead to sintering of the minerals or coking on the surface of the minerals when used as a support for a catalyst in reforming reactions. Such impurities that may induce sintering or coking during syngas production include iron, nickel, manganese, sodium, potassium, chloride, calcium, lithium, rubidium, berylium, barium, $SiO_2$, and/or organic impurities. By way of example, when clay minerals are heated at elevated temperatures such as those used in carbon dioxide reformation of hydrocarbons to produce syngas, such impurities (e.g., iron or potassium) within the clay mineral could fuse together. Removal or reducing the amounts of such impurities can therefore help reduce or avoid sintering and/or coking.

For alkaline earth metal/metal oxide supports that can be used in the context of the present invention, such supports have the following general structure: D-E, where D is a $M_1$ or $M_1M_2$, and $M_1$ and $M_2$ are each individually an alkaline earth metal selected from the group consisting of Mg, Ca, Ba, and Sr, and E is a metal oxide selected from the group consisting of $Al_2O_3$, $SiO_2$, $ZrO_2$, $TiO_2$, and $CeO_2$. Specific compounds are disclosed above and throughout this specification. These compounds are commercially available from a wide range of sources (e.g., Sigma-Aldrich® Co. LLC (St. Louis, Mo, USA); Alfa Aesar GmbH & Co KG, A Johnson Matthey Company (Germany)).

All of the support materials can be made by the process used in the examples section of this specification or by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, etc.).

B. Drying Step

The drying step of the present invention provides for an efficient and simplified process when compared with known processes. For example, once the solution is formed (or a dispersion having said solution), removal of the solvent through evaporation is sufficient to prepare a pyrochlore precursor material that can be transformed into a pyrochlore through calcination. No precipitation steps, no polymerization steps, no gelling steps, etc., need to be performed, such as seen in the current art.

By way of example only, the drying step can be subjecting the solution or dispersion to a sufficient temperature for a sufficient amount of time to evaporate the solvent and to produce a pyrochlore precursor material, which can be in powdered form. An example of a sufficient temperature range includes 60 to 100° C. An example of a sufficient amount of time can be 1 to 5 hours, or up to 1, 2, 3, 4, or 5 hours. The drying step can be performed under atmospheric conditions or open air/open atmosphere conditions, such as in a water bath or a hot plate. Alternatively, the drying step can be performed by using vacuum drying, such as with a rotary vacuum. Notably, while both forms of drying work, Applicant surprisingly discovered advantages of using vacuum drying over open air drying in that vacuum drying can result in a pyrochlore precursor material and a resultant pyrochlore catalyst having an increased surface area when compared with open air or open atmospheric drying conditions. An increased surface area can be advantageous in that it can result in a more efficient catalyst that has more catalytic or active cites during use.

The produced pyrochlore precursor material can then be calcined if desired or can be subjected to a slow evaporation step.

C. Slow Evaporation Step

A slow evaporation step can be used after the drying step so as to slowly evaporate any excess or remnant solvent from the pyrochlore precursor material formed after the drying step. This slow evaporation step can be used to influence the mechanical or physical properties of pyrochlore precursor material and/or the resulting pyrochlore catalyst. For instance, slow evaporation can result in a higher surface area and well defined grain size and shape of the powdered precursor material. The slow evaporation step can include subjecting the powdered pyrochlore precursor material to a temperature range of 100° C. to 150° C. for 1 to 3 hours or for a sufficient temperature and time to evaporate the excess or remnant solvent. A variety of heat sources can be used to perform this, such as an oven, a water bath, a hot plate, vacuum, etc.

D. Calcination Step

Calcination of the pyrochlore precursor material allows for the formation of the pyrochlore phase or pyrochlore structure noted above. The calcination step can be a standard calcination technique used by those having ordinary skill in the art. For instance, and in the context of pyrochlore catalysts and pyrochlore supported catalysts, the calcination step can be subjecting the pyrochlore precursor material to a sufficient temperature for a sufficient time to produce a pyrochlore catalyst or a pyrochlore supported catalyst. A sufficient temperature range can be 800° C. to 1500° C., 900° C. to 1100° C., or around 1000° C. A sufficient amount of time can be 7 to 9 hours.

E. Use of Produced Pyrochlore Catalysts

As illustrated in the Examples section, the produced catalysts can be used effectively in carbon dioxide reforming of methane reactions at a temperature range from 700° C. to 1100° C. or from 800° C. to 1100° C., a pressure range from 1 bara to 30 bara, and/or at a gas hourly space velocity (GHSV) range from 500 to 10000 $h^{-1}$. In instances when the produced catalytic material is used in carbon dioxide reformation reactions, the carbon dioxide in the gaseous feed mixture can be obtained from various sources. In one non-limiting instance, the carbon dioxide can be obtained from a waste or recycle gas stream (e.g. from a plant on the same site, like for example from ammonia synthesis) or after recovering the carbon dioxide from a gas stream. A benefit of recycling such carbon dioxide as starting material in the process of the invention is that it can reduce the amount of carbon dioxide emitted to the atmosphere (e.g., from a chemical production site). The hydrogen in the feed may also originate from various sources, including streams coming from other chemical processes, like ethane cracking, methanol synthesis, or conversion of methane to aromatics. The gaseous feed mixture comprising carbon dioxide and hydrogen used in the process of the invention may further contain other gases, provided that these do not negatively affect the reaction. Examples of such other gases include steam or oxygen. The hydrocarbon material used in the reaction can be methane. The resulting syngas can then be used in additional downstream reaction schemes to create additional products. Such examples include chemical products such as methanol production, olefin synthesis (e.g., via Fischer-Tropsch reaction), aromatics production, carbonylation of methanol, carbonylation of olefins, the reduction of iron oxide in steel production, etc.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Synthesis of $La_2Zr_2O_7$ Using Open Air Drying Step

Solution Formation: 7.6 g $La(NO_3)_3.6H_2O$ and 4.1 g of $ZrCl_4$ were dissolved in 10 ml de-ionized water to form a clear solution in a 100 ml beaker. 4.0 g of citric acid was added to the above solution. The total volume of the solution was adjusted to 15 ml with water. The molar ratio of citric acid: metal composition was 1:1.2. The solution was stirred for 5 minutes on a stirring plate to attain homogeneous mixture, followed by transferring the contents into a petri dish.

Drying: The solution containing petri dish was then placed on a hot plate (open air) and heated at 75° C. until all the solvent evaporated, which resulted in a pyrochlore precursor material in powdered form. No gelled or polymerized matrix was formed during this procedure.

Slow Evaporation: The dried powdered material was transferred to a ceramic crucible and further dried at 150° C. for 2 hours to allow for slow evaporation of any residual solvent—residual solvent can have a direct influence on the mechanical or physical properties of produced pyrochlore material. Further, this slow evaporation step results in higher surface area and well defined grain size and shape of the material.

Calcination: After slow evaporation step, the material was subjected to calcination at 1000° C. for 8 hours to produce $La_2Zr_2O_7$.

Another $La_2Zr_2O_7$ was prepared using the above method but without the addition of the chelating agent citric acid.

Example 2

Synthesis of $La_2Zr_2O_7$ Using Vacuum Drying Step

Solution Formation: 7.6 g $La(NO_3)_3.6H_2O$ and 4.1 g of $ZrCl_4$ were dissolved in 10 ml methanol to form a clear solution in a 100 ml beaker. 4.0 g of citric acid was added to the above solution. The total volume of the solution was adjusted to 15 ml with methanol. The molar ratio of citric acid:metal composition was 1:1.2.

Drying: Thereafter the solution was then transferred to a 250 ml round bottom flask. This was attached to the rotary evaporator for evaporating the metal precursor solution under vacuum. This was continued until it was observed to form a dry product in powdered form. No gelled or polymerized matrix was formed during this procedure.

Slow Evaporation: The dried powdered material was transferred to a ceramic crucible and further dried at 150° C. for 2 hours to allow for slow evaporation of any residual solvent.

Calcination: After slow evaporation step, the material was subjected to calcination at 1000° C. for 8 hours to produce $La_2Zr_2O_7$.

Example 3

Synthesis of Substituted $La_2Zr_{x-y}M_yO_7$ Using Vacuum Drying Step

Preparation of $La_2Rh_{0.11}Zr_{1.89}O_7$.

Solution Formation: 7.6 g of $La(NO_3)_3 \cdot 6H_2O$, 3.8 g of $ZrCl_4$, 0.2 g of $RhCl_3$ were dissolved in 10 ml of de-ionized water to form a clear solution in a 100 ml beaker. 4.0 g of citric acid was added to the above solution. The total volume of the solution was adjusted to 15 ml with water. The above solution was stirred for 5 minutes on a stirring plate to attain homogeneous mixture, followed by transferring the contents into a petri dish.

Drying: The solution containing petri dish was then placed on a hot plate and heated at 75° C. until all the solvent evaporated, which resulted in a pyrochlore precursor material in powdered form. No gelled or polymerized matrix was formed during this procedure.

Slow Evaporation: The dried powdered material was transferred to a ceramic crucible and further dried at 150° C. for 2 hours to allow for slow evaporation of any residual solvent.

Calcination: After slow evaporation step, the material was subjected to calcination at 1000° C. for 8 hours to produce $La_2Rh_{0.11}Zr_{1.89}O_7$.

The same method was used to prepare the following pyrochlores by replacing Rh with Ru, Ir, Ni, Co, Pt and Pd salts:

$La_2Ru_{0.11}Zr_{1.89}O_7$.
$La_2Ir_{0.11}Zr_{1.89}O_7$.
$La_2Ni_{0.11}Zr_{1.89}O_7$.
$La_2Co_{0.11}Zr_{1.89}O_7$.
$La_2Pt_{0.11}Zr_{1.89}O_7$.
$La_2Pd_{0.11}Zr_{1.89}O_7$.

Example 4

X-Ray Diffraction Patterns of Produced Pyrochlores

FIG. 1 powder X-ray diffraction patterns of pyrochlore catalysis (A) $La_2Ru_{0.11}Zr_{1.89}O_7$, (B) $La_2Ir_{0.11}Zr_{1.89}O_7$, (C) $La_2Ni_{0.11}Zr_{1.89}O_7$, (D) $La_2Co_{0.11}Zr_{1.89}O_7$, (E) $La_2Pt_{0.11}Zr_{1.89}O_7$, (F) $La_2Pd_{0.11}Zr_{1.89}O_7$ and (G) $La_2Zr_2O_7$. The diffractograms show the expected face-centered cubic unit cell structure. Peaks corresponding to the base pyrochlore $La_2Zr_2O_7$ (FIG. 1 (G)) were detected in all the samples indicating that the new novel synthesis route produces a well-crystalline pyrochlore structure similar to reported literature data (see Sarthak Gaura, Daniel J. Haynes, James J. Spivey. Rh, Ni, and Ca substituted pyrochlore catalysts for dry reforming of methane. Applied Catalysis A: General 403 (2011) 142-151). It can be inferred from the diffractograms of Rh, Ru, Ir, Ni, Co, Pt and Pd substituted pyrochlores that a low metal substitution on B site of pyrochlore crystal lattice does not affect the basic structure of pyrochlores.

Example 5

Synthesis of Pyrochlore Catalysts Grafted on Kaolin

Preparation of 10 wt. % $La_2Ni_{0.11}Zr_{1.89}O_7$ Grafted On Kaolin.

Solution Formation: 0.8 g of $La(NO_3)_3 \cdot 6H_2O$, 0.4 g of $ZrCl_4$, 0.02 g of $NiCl_2 \cdot 6H_2O$ was dissolved in 7.5 ml of de-ionized water to form a clear solution. 0.4 g of citric acid was added to the above solution. To this 5.1 g of purified kaolin powder (linear formula $Al_2Si_2O_5(OH)_4$) (obtained from Sigma-Aldrich®-K7375) was added.

Drying: The mixture of the solution and kaolin powder was then transferred to a 250 ml round bottom flask. This was attached to the rotary evaporator for further mixing for 15 minutes and then solvent evaporation under vacuum. This was continued until it was observed to form a dry product in powdered form. No gelled or polymerized matrix was formed during this procedure.

Figure 2:
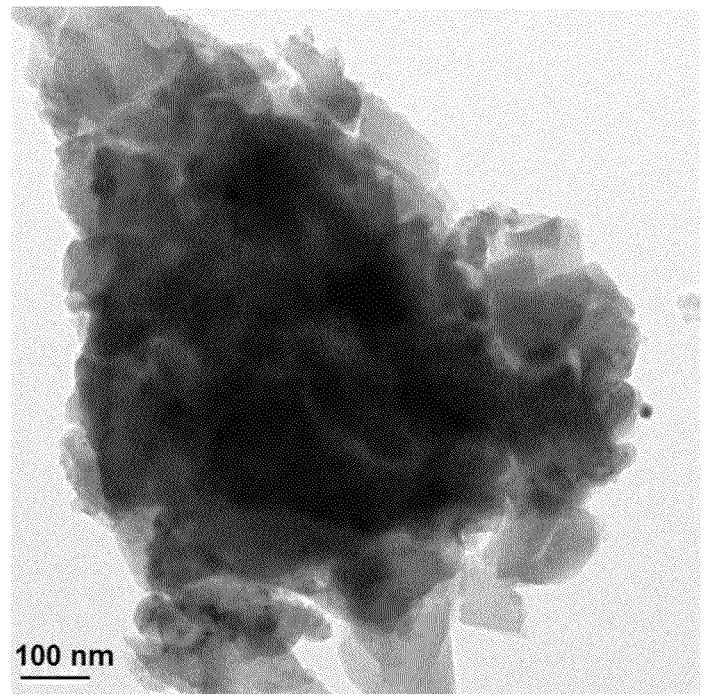
FIG. 2: Transmission electron micrograph of 10 wt. % $La_2Ni_{0.11}Zr_{1.89}O_7$/Kaolin catalyst calcined at 1000° C. for 8 hours.
Figure 3:
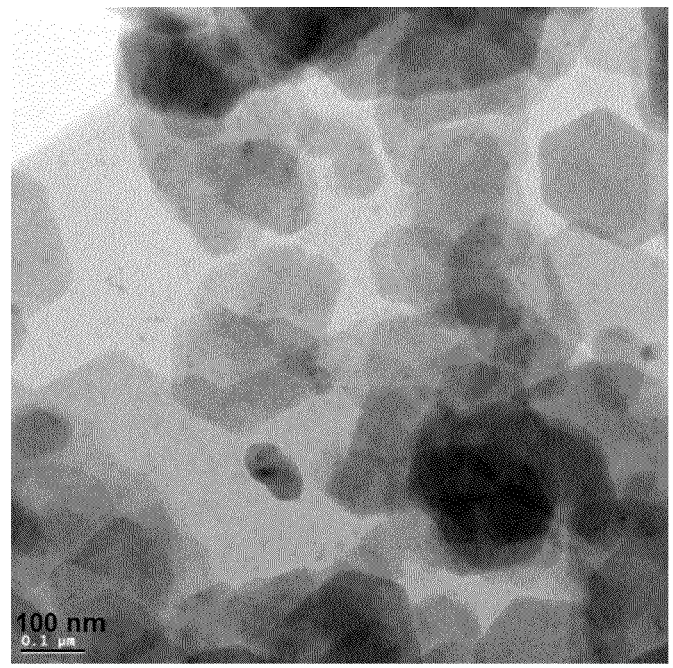
FIG. 3: Transmission electron micrograph of neat Kaolin calcined at 1000° C. for 8 hours.

Calcination: After drying, the material was subjected to calcination at 1000° C. for 8 hours to produce 10 wt. % $La_2Ni_{0.11}Zr_{1.89}O_7$ grafted onto kaolin. FIG. 2 is a transmission electron micrograph of the produced supported catalyst. For comparative purposes, FIG. 3 is a transmission electron micrograph of neat kaolin calcined at 1000° C. for eight hours.

In a separate experiment the quantities of metal precursors were doubled to obtain a 20 wt. % pyrochlore loaded catalyst grafted onto a kaolin support.

The same method was used to prepare the following pyrochlores grafted onto a kaolin support by using other metal precursors:

10 wt. % $La_2Pt_{0.11}Zr_{1.89}O_7$/kaolin.
20 wt. % $La_2Ru_{0.11}Zr_{1.89}O_7$/kaolin.
20 wt. % $La_2Rh_{0.11}Zr_{1.89}O_7$/kaolin.
20 wt. % $La_2Pd_{0.11}Zr_{1.89}O_7$/kaolin.

Figure 4:
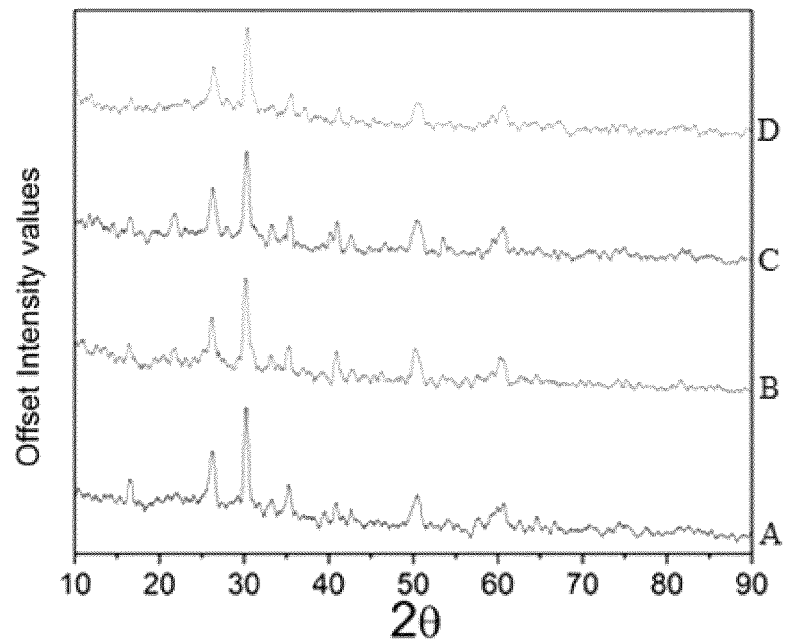
FIG. 4: Powder X-ray diffraction patterns of pyrochlore/kaolin catalysts (A) 20 wt. % $La_2Ru_{0.11}Zr_{1.89}O_7$/kaolin, (B) $La_2Rh_{0.11}Zr_{1.89}O_7$/kaolin, (C) $La_2Pd_{0.11}Zr_{1.89}O_7$/kaolin and (D) $La_2Ni_{0.11}Zr_{1.89}O_7$/kaolin.

FIG. 4 includes powder X-ray diffraction patterns of pyrochlore/kaolin catalysts (B) 20 wt. % $La_2Ru_{0.11}Zr_{1.89}O_7$/kaolin, (C) 20 wt. % $La_2Rh_{0.11}Zr_{1.89}O_7$/kaolin, (D) 20 wt. % $La_2Pd_{0.11}Zr_{1.89}O_7$/kaolin and (E) 20 wt. % $La_2Ni_{0.11}Zr_{1.89}O_7$/kaolin.

Example 6

Synthesis of Pyrochlore Catalysts Grafted On $MgAl_2O_4$

Preparation of 10 wt. % $La_2Ni_{0.11}Zr_{1.89}O_7$ Grafted On $MgAl_2O_4$.

Solution Formation: 0.8 g of $La(NO_3)_3 \cdot 6H_2O$, 0.4 g of $ZrCl_4$, 0.02 g of $NiCl_2 \cdot 6H_2O$ was dissolved in 7.5 ml of de-ionized water to form a clear solution. 0.4 g of citric acid was added to the above solution. To this 5.1 g of $MgAl_2O_4$ powder was added. The $MgAl_2O_4$ powder was prepared as follows: equimolar solutions of an alkaline earth metal salt (12.81 g) $Mg(NO_3)_2 \cdot 6H_2O$ in 50 ml of $H_2O$) and aluminum nitrate (37.51 g $Al(NO_3)_3 \cdot 9H_2O$ in 50 mL of $H_2O$) were mixed in a 500 mL beaker. To this solution, 27% v/v ammonium hydroxide solution was added drop wise under vigorous stirring until the pH of the slurry reached 9.8-10. After complete precipitation, stirring was continued for 1 hour. Thereafter, the precipitated slurry was digested in a water bath for 12 hours at 80° C. The residue was separated by centrifugation, washed six times with 200 mL portions of water to eliminate any residual ions. The residue was dried at 120° C. for 12 hours followed by calcination at 800° C. for 8 hours.

Drying: The mixture of the solution and $MgAl_2O_4$ powder was then transferred to a 250 ml round bottom flask. This was attached to the rotary evaporator for further mixing for 15 minutes and then solvent evaporation under vacuum. This was continued until it was observed to form a dry product in powdered form. No gelled or polymerized matrix was formed during this procedure.

Figure 5:
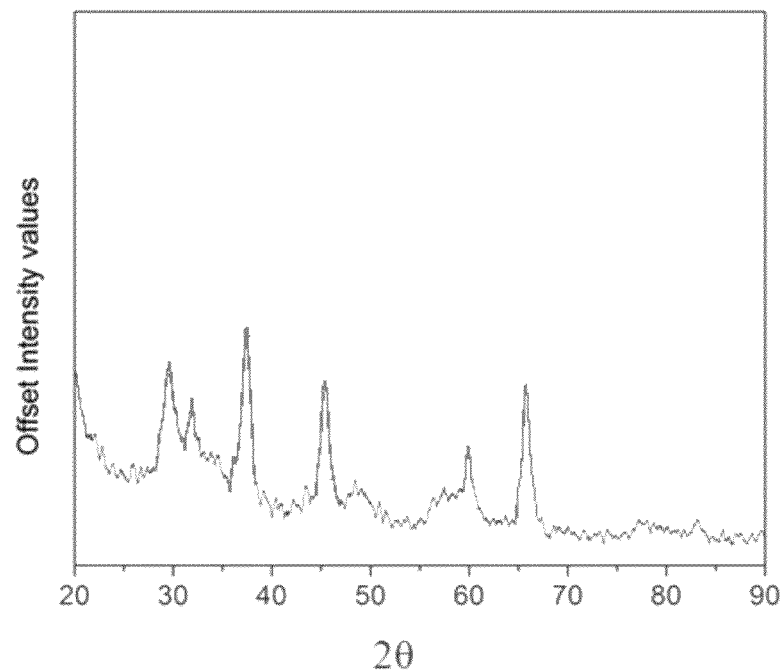
FIG. 5: Powder X-ray diffraction pattern of 20 wt. % $La_2Ni_{0.11}Zr_{1.89}O_7$ on $MgAl_2O_4$.

Calcination: After drying, the material was subjected to calcination at 1000° C. for 8 hours to produce 10 wt. % of $La_2Ni_{0.11}Zr_{1.89}O_7$ pyrochlore catalyst supported on $MgAl_2O_4$. A 20 wt. % of $La_2Ni_{0.11}Zr_{1.89}O_7$ on $MgAl_2O_4$ supported catalyst was also prepared by using the above procedure too. The presence of diffraction peaks at 2θ equal to 29.64, 31.9 and 59.84 in FIG. 5 confirms the presence of pyrochlore phase, and peaks at 2θequal to 37.42, 45.38 and 65.78 confirms the $MgAl_2O_4$ phase in the catalyst (FIG. 5). The other peaks are due to La and Ni bimetallic phases in an oxidized state.

Example 7

Surface Area of Produced Pyrochlores

Table 1 provides surface area data for the produced pyrochlore catalysts. From the surface area data it can be inferred that the non-substituted pyrochlore catalyst (SI. No. 1, 2, and 3 in Table 1) synthesized via use of rotary evaporator for drying step (i.e., vacuum drying) showed higher surface area as compared to the catalyst synthesized via use of hot plate for drying step (i.e., open air). This could be the effect of using vacuum drying compared to the normal open drying. The vacuum drying reduces particles from agglomeration and resulted in higher surface area.

Considering the substituted pyrochlore catalyst (SI. No. 4 to 10, in Table 1), even though drying was carried out in an open atmosphere the surface area increased by 15-30% compared to non-substituted catalysts which were also dried in similar manner. Substituting a tetravalent ion of an element selected from the group consisting of Pt, Pd, Ni, Mo, Rh, Ru, and Ir, where in $0 \leq y-z \leq 2$, helps in increasing the surface area of the resultant catalyst.

TABLE 1

| SI. No | Catalyst/Support Composition | Drying Step | Solvent Used | Surface Area $(m^2/g)$ |
|---|---|---|---|---|
| 1 | $La_2Zr_2O_7$ | open air | water | 0.3 |
| 2 | $La_2Zr_2O_7$ | vacuum | water | 5.0 |
| 3 | $La_2Zr_2O_7$ | vacuum | methanol | 12.4 |
| 4 | $La_2Rh_{0.11}Zr_{1.89}O_7$ | open air | water | 11.7 |
| 5 | $La_2Ru_{0.11}Zr_{1.89}O_7$ | open air | water | 9.4 |
| 6 | $La_2Ir_{0.11}Zr_{1.89}O_7$ | open air | water | 8.6 |
| 7 | $La_2Ni_{0.11}Zr_{1.89}O_7$ | open air | water | 3.6 |
| 8 | $La_2Co_{0.11}Zr_{1.89}O_7$ | open air | water | 2.9 |
| 9 | $La_2Pt_{0.11}Zr_{1.89}O_7$ | open air | water | 11.1 |
| 10 | $La_2Pd_{0.11}Zr_{1.89}O_7$ | open air | water | 12.0 |
| 11 | 10% $La_2Ni_{0.11}Zr_{1.89}O_7$/Kaolin | vacuum | water | 16.3 |
| 12 | 20% $La_2Ni_{0.11}Zr_{1.89}O_7$/Kaolin | vacuum | water | 8.8 |
| 13 | 20% $La_2Ni_{0.11}Zr_{1.89}O_7$/$MgAl_2O_4$ | vacuum | water | 42.8 |
| 14 | 10% $La_2Pt_{0.11}Zr_{1.89}O_7$/Kaolin | vacuum | water | 18.2 |
| 15 | Kaolin | — | — | 16.2 |

Example 8

Catalytic Data

Carbon dioxide reforming of methane (CDRM) reactions with 10 wt. % $La_2Ni_{0.11}Zr_{1.89}O_7$/Kaolin and 10 wt. % $La_2Pt_{0.11}Zr_{1.89}O_7$/Kaolin were performed at 800° C. and 1 bara, 800° C. and 1 bara, and 915° C. and 1 bara, respectively, for 20 hours. Prior to the reactions, each of the catalysts were first reduced in 10 vol. % $H_2$ atmosphere at 900° C. for 4 hours. Subsequently, the CDRM reactions were each initiated by changing the gas mixture to 10 vol. % of $CH_4$, 10 vol. % of $CO_2$, and 80 vole % $N_2$. Both GC and Mass spectrometer were used to monitor gas composition. The 200-500 mesh size catalyst powder was used for testing, and the GHSV applied was 5000 $h^{-1}$. Comparative CDRM reactions for each of the catalysts were also performed at the same pressure (1 bara) but at a temperature of 700° C. and coking and catalyst deactivation occurred at this temperature.

Figure 6:
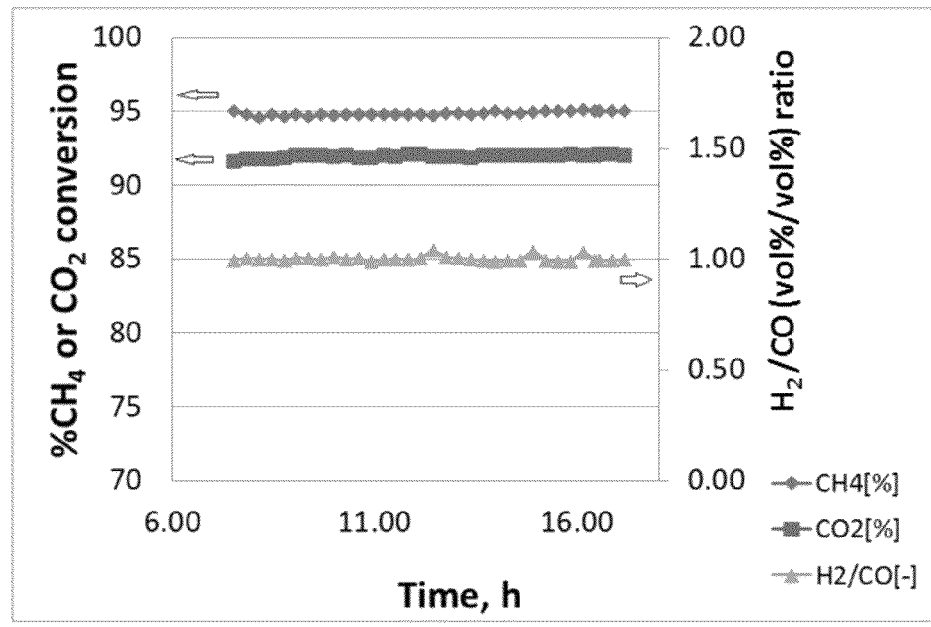
FIG. 6: Carbon dioxide reforming of methane (CDRM) with 10 wt. % $La_2Ni_{0.11}Zr_{1.89}O_7$/Kaolin catalysts at 800° C. and 1 bara.
Figure 7:
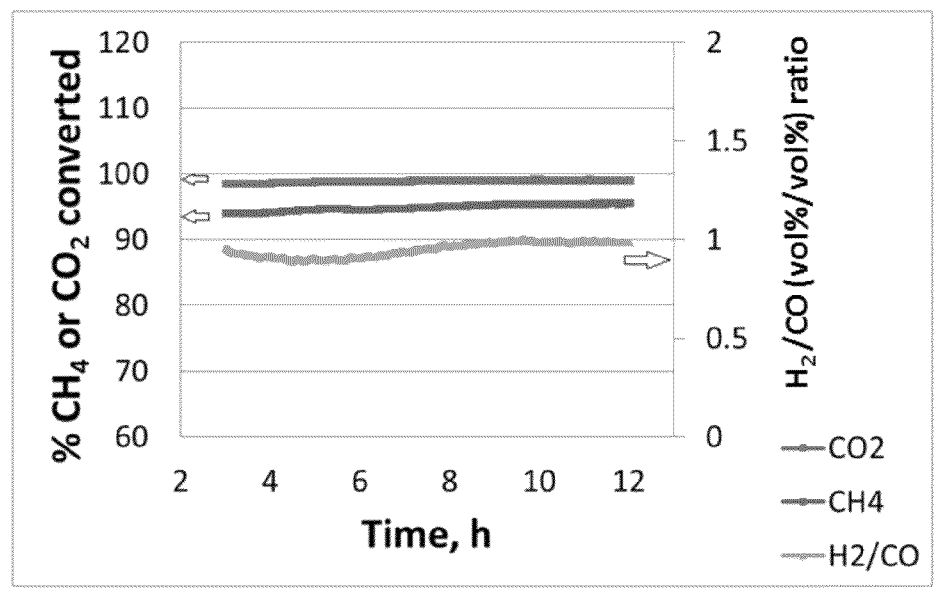
FIG. 7: CDRM with 10 wt. % $La_2Pt_{0.11}Zr_{1.89}O_7$/Kaolin catalysts at 915° C. and 1 bara.

The $H_2/CO$ ratio obtained from the reactions was about 1:1 (see FIGS. 6-7). Further, each of the catalysts were found to be stable without any deactivation for 20 hours of duration. Notably, coke formation was not observed (no appearance of dark black color on catalysts) in any of these catalysts at temperatures above 800° C. This was confirmed by performing a loss on ignition test of the used catalysts in an open atmosphere at 800° C. By comparison, coke formation was observed (catalyst turned dark black in color) at a temperature of 700° C. Further, no sintering was observed.

Example 9

Catalytic Data High Throughput Reactor System

Catalysts testing were performed in a high throughput reactor system supplied by HTE®, Germany. Reactors were of plug flow type and made up of steel SS316, with an inner ceramic liner. Ceramic liner with 5 mm in diameter and 55 cm in length was used to avoid coking due to methane cracking on a steel surface. The gas between the inner steel surface and outer ceramic liner wall was sealed with a leak proof graphite ferrule, which ensured 100% feed gas passed through ceramic liner containing catalyst and inert material. Catalyst pellets were crushed and sieved to a particle size between 100-300 μm. Catalyst loading information is listed in Table 2. The catalyst sieve fraction was placed on top of inert material inside the ceramic liner. A mixture of (45 vol. % of $CO_2$, 45 vol. % of $CH_4$, and 10 vol. % of Ar) was used as feed. Argon was used as an internal standard for GC analysis.

TABLE 2

| Catalyst | GHSV, $h^{-1}$ | Feed flow ml/min | CBD, g/cc | Catalyst volume, ml |
|---|---|---|---|---|
| $La_2Co_{0.11}Zr_{1.89}O_7$ | 25,000 | 48.75 | 2.08 | 0.12 |
| $La_2Pt_{0.11}Zr_{1.89}O_7$ | 25,000 | 48.75 | 1.97 | 0.12 |
| $La_2Ni_{0.11}Zr_{1.89}O_7$ | 25,000 | 48.75 | 2.0 | 0.12 |
| $La_2Ru_{0.11}Zr_{1.89}O_7$ | 25,000 | 48.75 | 1.5 | 0.12 |
| 20 wt. % $La_2Rh_{0.11}Zr_{1.85}O_7$/Kaolin | 5,000 | 48.75 | 1.14 | 0.59 |

Note:
CBD: catalyst bed density of sieve fraction between 100-300 μm.

The catalyst in an oxidized state was heated to 800° C. in the presence of (90 vole % of $N_2$ and 10 vole % of Ar). The ($CH_4$ and $CO_2$) mixture was dosed in 4 steps with 5 minutes intervals replacing equivalent amount of nitrogen in each step. Four catalysts were tested at 800° C., 1 bar pressure and approximately gas hourly space velocity (GHSV)=25,000 $h^{-1}$. After reaching a feed composition of (45 vol. % of $CO_2$, 45 vol. % of $CH_4$, and 10 vol. % of Ar), gas analysis was started after 1 hour of equilibration time. An Agilent® GC 7867 was used for gas analysis. Methane and $CO_2$ conversion was calculated as follows:

$$\text{Methane conversion} = \frac{\text{mol of methane converted}}{\text{mol of methane in feed}} \times 100$$

$$\text{Carbon dioxide conversion} = \frac{\text{mol of carbon dioxide converted}}{\text{mol of carbon dioxide in feed}} \times 100$$

The ratio of hydrogen to carbon monoxide is calculated as follows:

$$H2/CO = \frac{\text{mol of Hydrogen in product}}{\text{mol of carbon monoxide in product}}$$

Figure 8:
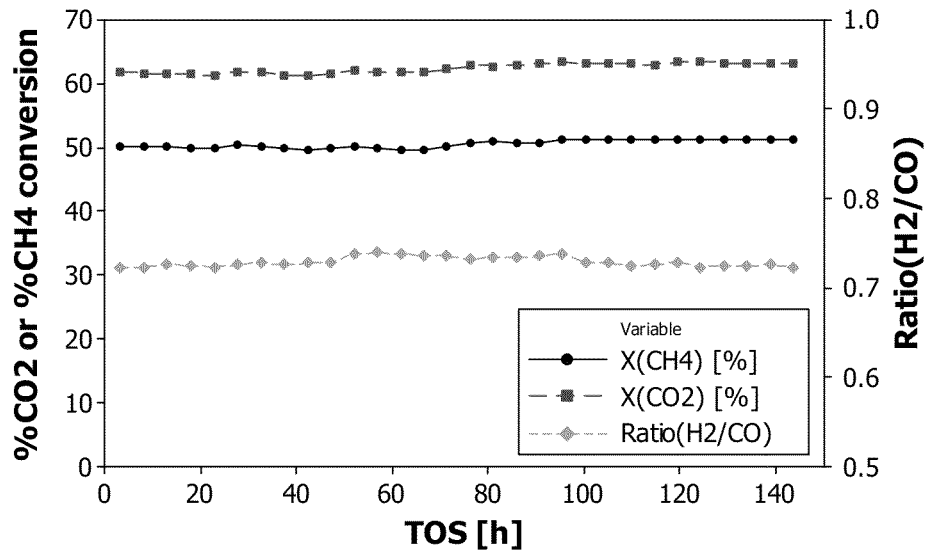
FIG. 8: CDRM with $La_2Co_{0.11}Zr_{1.89}O_7$ catalyst at 800° C. and 1 bara.
Figure 9:
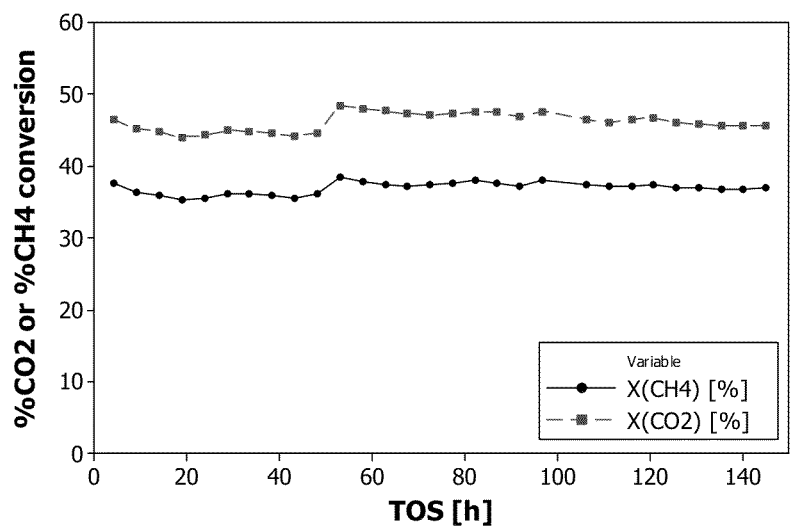
FIG. 9: CDRM with $La_2Pt_{0.11}Zr_{1.89}O_7$, catalyst at 800° C. and 1 bara.
Figure 10:
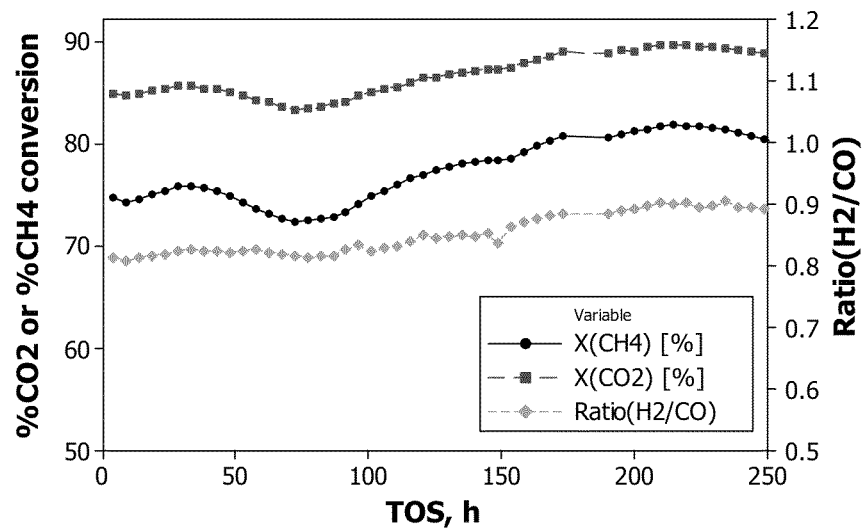
FIG. 10: CDRM with $La_2Ni_{0.11}Zr_{1.89}O_7$ catalyst at 800° C. and 1 bara.
Figure 11:
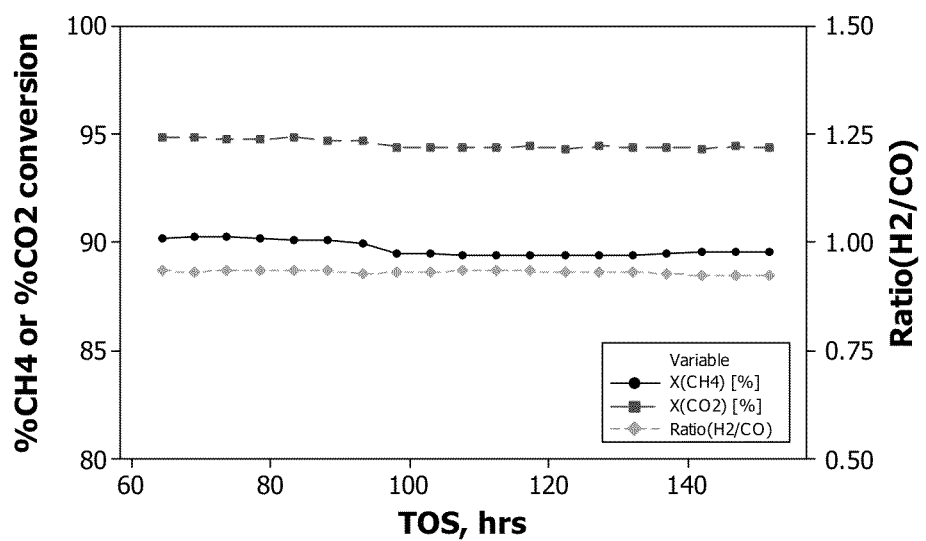
FIG. 11: CDRM with $La_2Ru_{0.11}Zr_{1.89}O_7$ catalyst at 800° C. and 1 bara.

The bulk metal pyrochlore catalysts ($La_2Co_{0.11}Zr_{1.89}O_7$, $La_2Pt_{0.11}Zr_{1.89}O_7$, $La_2Ni_{0.11}Zr_{1.89}O_7$, and $La_2Ru_{0.11}Zr_{1.89}O_7$) were synthesized by following the procedure described in Example 3 and tested for $CO_2$ reforming of $CH_4$ (CDRM). FIGS. 8-11 are graphical depictions of CDRM using $La_2Co_{0.11}Zr_{1.89}O_7$, $La_2Pt_{0.11}Zr_{1.89}O_7$, $La_2Ni_{0.11}Zr_{1.89}O_7$, $La_2Ru_{0.11}Zr_{1.89}O_7$ bulk metal catalysts. FIG. 8 is a graphical representation of CDRM with $La_2Co_{0.11}Zr_{1.89}O_7$ catalyst. FIG. 9 is a graphical representation of CDRM with $La_2Pt_{0.11}Zr_{1.89}O_7$, catalyst. FIG. 10 is a graphical representation of CDRM with $La_2Ni_{0.11}Zr_{1.89}O_7$ catalyst. FIG. 11 is a graphical representation of CDRM with $La_2Ru_{0.11}Zr_{1.89}O_7$ catalyst. Each of the catalysts were found to be stable without any deactivation after 150-250 hours of operation at GHSV=25,000 $h^{-1}$. The $H_2/CO$ ratios obtained with $La_2Co_{0.11}Zr_{1.89}O_7$, $La_2Pt_{0.11}Zr_{1.89}O_7$, $La_2Ni_{0.11}Zr_{1.89}O_7$, $La_2Ru_{0.11}Zr_{1.89}O_7$ catalysts were 0.87, 0.75, 0.9 and 0.93 respectively.

Figure 12:
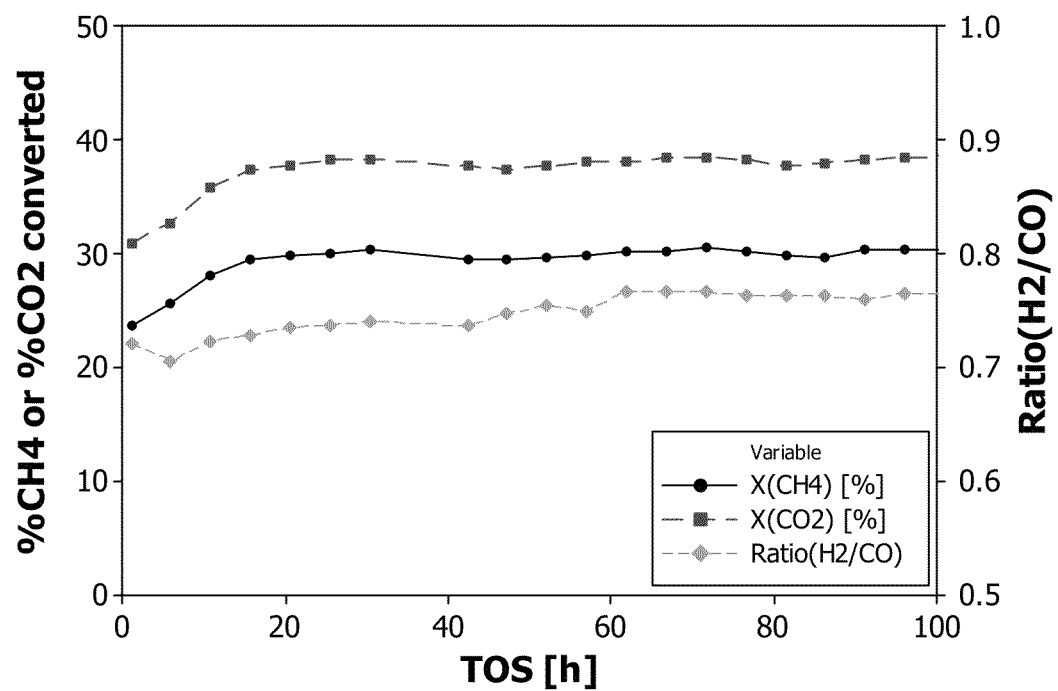
FIG. 12: CDRM with 20 wt. % $La_2Rh_{0.11}Zr_{1.85}O_7$/Kaolin catalyst at 800° C. and 1 bara.

FIG. 12 is a graphical representation CDRM with 20 wt. % $La_2Rh_{0.11}Zr_{1.85}O_7$/kaolin catalyst synthesized via protocols described in Example 5. The $H_2/CO$ ratio obtained was 0.76 at GHSV=5,000 $h^{-1}$. The catalyst was stable without any deactivation due to coking or sintering after about 100 hours of operation.

The difference in the $H_2/CO$ ratio between different catalysts in Example 9 was due to a reverse water gas shift reaction ($CO_2+H_2=CO+H_2O$) occurring. The reverse water gas shift reaction was dependent on the methane and $CO_2$ conversion. At a higher conversion, the water gas shift reaction reached equilibrium and gave a higher $H_2/CO$ ratio. The higher $H_2/CO$ ratio was also attributable for different kinetics for reforming and water gas shift reaction. Thus, the $H_2/CO$ ratio was not catalyst specific. The $H_2/CO$ ratio near to 1 can be obtained by increasing the $CH_4$ and $CO_2$ conversion by decreasing the GHSV, $h^{-1}$ of the catalytic reaction.

The invention claimed is:

1. A method of making a pyrochlore comprising:
   (a) obtaining a solution comprising a solvent and metal precursors capable of forming a pyrochlore, wherein the metal precursors are dissolved in the solvent;
   (b) subjecting the solution to a drying step to obtain a non-gelled or non-polymerized pyrochlore precursor material in powdered form; and
   (c) subjecting the pyrochlore precursor material to a calcination step to obtain a pyrochlore,
   wherein a gelled or polymeric matrix is not formed in any of steps (a) to (c).

2. The method of claim 1, wherein the solvent is water, methanol, ethanol, propanol, isopropanol, butanol, acetone, or mixtures thereof.

3. The method of claim 2, wherein the solvent is water or methanol.

4. The method of claim 1, wherein the metal precursors are metal salts or metal oxides or a combination thereof.

5. The method of claim 1, wherein the metal precursors include a trivalent ion of La, Ce, Nd, Bi, Sc, or Y or a tetravalent ion of an element of Zr, Pt, Pd, Ni, Mo, Rh, Ru, or Ir, or a bivalent, trivalent or tetravalent ion of Ba, Ca, Cu, Mg, Ru, Rh, Pt, Pd, Ni, Co, Ir, or Mo.

6. The method of claim 5, wherein the pyrochlore has a structure of:

wherein
A is a trivalent ion of an element of La, Ce, Nd, Bi, Sc, or Y, where 0≤x≤2,
B is a tetravalent ion of an element of Zr, Pt, Pd, Mo, Rh, Ru, or Ir, where 0≤y−z≤2, and
C is a bivalent, trivalent or tetravalent ion of Ba, Ca, Cu, Mg, Ru, Rh, Pt, Pd, Ni, Co, Ir, or Mo, where 0≤z≤2.

7. The method of claim 1, wherein the pyrochlore has a structure of $La_2Zr_2O_7$, $La_2R_{0.11}Zr_{1.89}O_7$, $La_2Ir_{0.11}Zr_{1.89}O_7$, $La_2Ni_{0.11}Z_{1.89}O_7$, $La_2Pt_{0.11}Zr_{1.89}O_7$, or $La_2Pd_{0.11}Zr_{1.89}O_7$.

8. The method of claim 1, further comprising adding a chelating agent to the solution.

9. The method of claim 8, wherein the chelating agent is citric acid, EDTA, disodium EDTA, trisodium EDTA, EGTA, phosphoric acid, or succinic acid.

10. The method of claim 9, wherein the chelating agent is citric acid.

11. The method of claim 9, wherein the molar ratio of the chelating agent to the total amount by weight of metal within the metal precursors ranges from 1:0.1 to 1:1.5.

12. The method of claim 1, wherein the drying step (b) comprises subjecting the solution to a temperature range of 60 to 100° C. for a sufficient amount of time to substantially remove or evaporate the solvent from the solution to obtain the pyrochlore precursor material in powdered form.

13. The method of claim 12, wherein the drying step (b) is performed under atmospheric conditions.

14. The method of claim 13, wherein the drying step (b) comprises using a water bath or a hot plate.

15. The method of claim 12, wherein the drying step (b) comprises using vacuum evaporation.

16. The method of claim 15, wherein the vacuum evaporation is performed within a rotary evaporator.

17. The method of claim 12, further comprising subjecting the pyrochlore precursor material to a temperature range of 100° C. to 150° C. for 1 to 3 hours.

18. The method of claim 1, wherein the calcination step (c) comprises subjecting the pyrochlore precursor material to a temperature range of 800° C. to 1500° C. for sufficient amount of time to produce the pyrochlore.

19. The method of claim 18, wherein the calcination step (c) comprises subjecting the pyrochlore precursor material to a temperature range of 900° C. to 1100° C. for 7 to 9 hours.

20. The method of claim 1, wherein the drying step (b) and calcination step (c) are not performed in a reducing or non-oxidizing atmosphere.

21. The method of claim 1, wherein the pyrochlore precursor material is not precipitated out of the solution in step (a) and step (b), and wherein ammonium carbonate is not added to the solution in step (a) and step (b).

22. The method of claim 1, wherein the solution in steps (a) and (b) does not include a ployhydroxy alcohol.

23. The method of claim 1, wherein a support material is dispersed in the solution.

24. The method of claim 23, wherein the support material comprises a clay mineral or an alkaline earth metal/metal oxide compound.

25. The method of claim 1, wherein the pyrochlore is capable of catalyzing the production of a gaseous mixture comprising hydrogen and carbon monoxide from a hydrocarbon gas.

* * * * *

UNITED STATES PATENT AND TRADEMARK OFFICE
CERTIFICATE OF CORRECTION

PATENT NO. : 9,126,189 B2
APPLICATION NO. : 14/311925
DATED : September 8, 2015
INVENTOR(S) : Lawrence D'Souza et al.

It is certified that error appears in the above-identified patent and that said Letters Patent is hereby corrected as shown below:

IN THE CLAIMS

In Claim 22 on Column 18, line 56, "ployhydroxy" should read --polyhydroxy--.

Signed and Sealed this
Twenty-sixth Day of January, 2016

Michelle K. Lee
*Director of the United States Patent and Trademark Office*